Patented July 3, 1945

2,379,823

UNITED STATES PATENT OFFICE 2,379,823

ACID RECOVERY PROCESS

Henry O. Mottern, Hillside, N. J., assignor to Standard Oil Development Company, a corporation of Delaware No Drawing. Application January 1, 1942,
Serial No. 425,305

3 Claims. (Cl. 23—172)

The present invention relates to a process for decarbonizing slop acids recovered as a residue from processes for the manufacture of alcohol from the olefins contained in gases and distillates from petroleum oil refining processes.

The method is particularly applicable to the treatment of weak acid recovered from processes in which hydrocarbon fractions containing respectively ethylene, propylene, the butylenes and amylenes have been extracted with strong acid for the purpose of manufacturing alcohol from the olefins absorbed in the strong acid extract. In order to remove the alcohol, the strong acid extract is diluted, hydrolyzed and steam distilled to recover the alcohol and the weak acid is drained from the still. The weak acid contains carbon in several forms, e. g. alcohol, ketone, sulfonic acid, hydroxy and polyhydroxy sulfonic acid, resin and tar. Restoration of weak acid without special decarbonization treatment yields a strong acid which is not suitable for re-use for olefin absorption because of its high carbon content.

Where sulfuric acid is used for olefin absorption it is most desirable to use acid containing not more than 0.2% carbon and preferable that the concentration be 0.1% or less. Decarbonization of acid at 88–98% strength as at present practiced consists of either bleaching the strong acid by chemical agents or by the prolonged digestion of the acid restored to an acid concentration of from 88–98% acid strength by evaporation or fortification with $SO_3$, which causes considerable loss of $H_2SO_4$ as $SO_2$. Decarbonization of the weak acid without substantial concentration may be accomplished by the distillation of the weak acid under pressure which removes the organic material as volatile compounds. The known methods yield acid which can be used to absorb olefinic compounds but are expensive as regards to the chemicals employed and operating costs involved.

According to the present invention, decarbonization of weak acid, recovered from the alcohol process, is accomplished in the course of concentrating the acid by maintaining the acid within the limited range of acid concentrations at which carbon is precipitated in a filterable form for a length of time sufficient to permit substantially all of the carbon to precipitate in a filterable form, filtering to remove the precipitated carbon and then continuing the step of concentrating the acid to recycle strength. Concentration of the acid is conducted at atmospheric or superatmospheric pressure using any suitable means of heating. When concentrating at atmospheric pressure, carbon is formed and thrown out of solution in a filterable condition when the acid concentration reaches 75–80%, that is, approximately 58.1–61.1° Baumé. By maintaining the temperatures of the 75–80% acid at its boiling point under atmospheric pressure, without further concentration for a period of from 5 to 30 minutes, 90–95% of the organic material is converted to elemental carbon.

The weak acid charged in general from 35% to 50% (approximately 29.9 to 41.1° Baumé) on a hydrocarbon-free basis, contains from 0.9 to 4.0% of total carbon, of which from 0.5 to 1.5% is sulfonate or fixed carbon. After the combined carbon in the form of organic material has been converted to elemental carbon, the acid is immediately filtered in any suitable equipment, such as a filter press, sand bed filter or centrifugal without further concentration, to remove the precipitated carbon. The acid is then subjected to further concentration to an acid strength of from 88–95%. Acid restored in this manner contains from .05 to .2% total carbon. The filtration of carbon from partially restored acid is most rapid at concentrations of from 65 to 80% acid strength. It is necessary to hold the acid strength below 80% while converting the combined carbon to elemental carbon, because at concentrations above 80% acid strength, the precipitated carbon again dissolves or becomes peptized to a colloidal form in which state or conditions it is virtually unfilterable.

As above-stated, carbonization under atmospheric pressure occurs within the range of temperatures at which 75 to 80% acid boils. Carbon formation from acid solutions of less than 75% acid concentration can be obtained if the temperature of the acid is raised sufficiently. Such temperatures are not possible at atmospheric pressure, if the acid concentration is to remain constant, due to the much lower boiling point of the more dilute acid. Therefore, it is necessary, in order to secure carbonization of the weaker acid solutions, to resort to the expedient of conducting the carbonization under superatmospheric pressure and at the temperature at which carbonization occurs.

The following example is given for the purpose of illustrating the invention:

Weak acid from the alcohol stripping stills was concentrated from 45% to 78% by blowing hot flue gases through the acid. When the acid strength reached 78%, the rate of flue gas flow was reduced so that the temperature of the boiling 78% acid was maintained over a period of 15 minutes without increasing the acid strength above 79%. The acid was then clay filtered to remove the precipitated carbon. The filtered acid was then restored to 88% strength by further concentration. The restored acid contained .1% total carbon.

What is claimed is:

1. The process of restoring weak acids obtained in the process of manufacture of alcohols from olefins, which comprises concentrating the weak acid to a concentration of 75–80% on a hydrocarbon-free basis, maintaining the 75–80% acid at substantially its boiling point under atmospheric pressure without materially increasing its concentration for a period of from 5–30 minutes, to convert fixed carbon to elemental carbon and to precipitate the same, filtering the acid to remove the elemental carbon and concentrating the filtered acid to 88–95% acid strength.

2. The process of restoring weak acid of from 35–50% acid concentration on a hydrocarbon-free basis, obtained in the process of manufacture of alcohols from olefins which comprises concentrating the weak acid to an acid concentration of 75–80%, holding the 75–80% acid at substantially its boiling point under atmospheric pressure for a period of from 5 to 30 minutes without materially increasing the concentration of the acid to convert fixed carbon to elemental carbon and to precipitate the same, filtering to remove the elemental carbon and concentrating the filtered acid to an acid concentration of from 88–95%.

3. The process of restoring weak acid of 45% acid concentration on a hydrocarbon-free basis, obtained in the process of manufacture of alcohols from olefins which consists in concentrating the weak acid to 78% acid strength, substantially maintaining the 78% acid at its boiling point under atmospheric pressure for a period of 15 minutes while maintaining the acid concentration between 78% and 79% to convert fixed carbon to elemental carbon and to precipitate the same, filtering to remove the elemental carbon and concentrating the filtered acid to 88% strength.

HENRY O. MOTTERN.